United States Patent
Ohira et al.

(10) Patent No.: US 7,407,537 B2
(45) Date of Patent: Aug. 5, 2008

(54) INK SET FOR INK-JET RECORDING, METHOD FOR PRODUCING THE SAME, AND THE INK-JET PRINTER

(75) Inventors: Hideo Ohira, Tajimi (JP); Ryuji Kato, Ama-gun (JP); Akihiko Taniguchi, Haguri-gun (JP); Noriatsu Aoi, Ichinomiya (JP); Masaya Fujioka, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 309 days.

(21) Appl. No.: 11/142,311

(22) Filed: Jun. 2, 2005

(65) Prior Publication Data

US 2005/0279246 A1 Dec. 22, 2005

(30) Foreign Application Priority Data

Jun. 18, 2004 (JP) ............................. 2004-181753

(51) Int. Cl.
*C09D 11/02* (2006.01)
(52) U.S. Cl. ............... 106/31.27; 106/31.6; 106/31.58; 106/31.86
(58) Field of Classification Search .............. 106/31.27, 106/31.6, 31.58, 31.86
See application file for complete search history.

(56) References Cited

U.S. PATENT DOCUMENTS

| 4,849,773 | A | | 7/1989 | Owatari |
| 4,973,992 | A | | 11/1990 | Owatari |
| 5,637,138 | A | | 6/1997 | Yamazaki |
| 6,022,908 | A | * | 2/2000 | Ma et al. ..................... 523/160 |
| 6,281,267 | B2 | * | 8/2001 | Parazak ....................... 523/160 |
| 6,332,919 | B2 | * | 12/2001 | Osumi et al. ................ 106/31.6 |
| 6,342,095 | B1 | * | 1/2002 | Takizawa et al. ......... 106/31.27 |
| 6,500,875 | B2 | * | 12/2002 | Noguchi ....................... 522/42 |
| 6,521,034 | B1 | | 2/2003 | Osumi et al. |
| 6,631,974 | B2 | | 10/2003 | Shindo |
| 6,852,155 | B2 | | 2/2005 | Koga et al. |
| 2001/0020431 | A1 | | 9/2001 | Osumi et al. |
| 2003/0058317 | A1 | | 3/2003 | Kawamura et al. |
| 2003/0193555 | A1 | | 10/2003 | Koga et al. |

FOREIGN PATENT DOCUMENTS

| EP | 0 943 666 A2 | 9/1999 |
| JP | A-07-051687 | 6/1995 |

(Continued)

*Primary Examiner*—Veronica Faison-Gee
(74) *Attorney, Agent, or Firm*—Oliff & Berridge, PLC

(57) ABSTRACT

An ink set for ink-jet recording includes a pigment-based ink containing a negatively chargeable and self-dispersible pigment as a coloring agent and a dye-based ink containing an anionic dye as a coloring agent, and the ink set satisfies the following expression (1):

$$Dci < 1.1 \times Pci + 0.0001 \tag{1}$$

wherein "$Dci$" represents an amount of counter ion (mol/g) of the anionic dye contained in the dye-based ink, and "$Pci$" represents an amount of counter ion (mol/g) of the self-dispersible pigment contained in the pigment-based ink. The pigment aggregation can be greatly suppressed, and the high quality printing can be stably performed when the ink set for ink-jet recording composed of the pigment-based ink and the dye-based ink is carried on an ink-jet printer provided with a conventional maintenance system that is simple and at low cost.

17 Claims, 3 Drawing Sheets

FOREIGN PATENT DOCUMENTS

| | | |
|---|---|---|
| JP | A-09-025441 | 1/1997 |
| JP | A-2000-303014 | 10/2000 |
| JP | A-2002-080763 | 3/2002 |
| JP | A-2002-234151 | 8/2002 |
| JP | 2002-322393 | 11/2002 |
| JP | 2003-246949 | 9/2003 |

* cited by examiner

INK SET FOR INK-JET RECORDING, METHOD FOR PRODUCING THE SAME, AND THE INK-JET PRINTER

BACKGROUND OF THE INVENTION

1. Field of the Invention

The present invention relates to an ink set for ink-jet recording having a pigment-based ink and a dye-based ink, a method for producing the same, and an ink-jet printer.

2. Description of the Related Art

Dye-based inks, which are excellent in handling performance, which hardly deposit precipitates, which exhibit satisfactory color vividness or brightness, and which contain various types of anionic dyes as coloring agents, have been hitherto widely used as inks to be used for the ink-jet recording. On the other hand, pigment-based inks, which are slightly inferior to the dye-based ink in relation to the color vividness but which exhibit high image densities and low blurring properties, are also used as inks for ink-jet recording. Those having been used as the pigment employed as the coloring agent for the pigment-based ink as described above include negatively chargeable and self-dispersible pigments which do not require, in principle, additives such as surfactants that affect physical properties of the ink and which have relatively high degrees of freedom of the ink design (Japanese Patent Application Laid-open No. 2000-303014).

Until now, the pigment-based ink and the dye-based ink have not been used simultaneously for a single ink-jet printer because of the difference between the ink physical properties of the pigment-based ink and the dye-based ink. However, in order to effectively utilize the advantages of the respective inks, an ink-jet printer has become commercially available, which carries an ink set for ink-jet recording including a pigment-based ink (black ink) based on the use of a black pigment as a coloring agent and a dye-based ink (color ink) based on the use of a yellow, cyan, or magenta dye as a coloring agent. When letter or character data is printed by using the black pigment-based ink with the ink-jet printer as described above, a letter print, which has excellent visual recognition performance, is obtained, because the printed letters have sharp edges with high contrast as well. On the other hand, for example, when graphic data is printed, the color portion provides vivid colorfulness. When the pigment-based ink is used as the black ink for the ink-jet recording, and the dye-based ink is used as the color ink for the ink-jet recording, then it can be expected that both of the visual recognition performance of the letters and the vividness of the color portion is simultaneously obtained.

However, the following phenomenon occurs in the case of the ink-jet printer which carries a general ink set for ink-jet recording including a pigment-based ink based on the use of a negatively chargeable and self-dispersible pigment and a dye-based ink based on the use of an anionic dye. That is, when the pigment-based ink and the dye-based ink make contact with each other, and they are mixed with each other, then the counter ion such as sodium ion, which is contained in the anionic dye in the dye-based ink, acts on the dispersing group located on the pigment surface of the self-dispersing and negatively chargeable pigment contained in the pigment-based ink. As a result, the degree of dissociation or dissociation ratio is lowered, and the surface charge (charge amount) of the pigment is decreased. Therefore, the electric repulsive force of the pigment is lowered, or the electric repulsive force is lost. The dispersibility of the pigment contained in the pigment-based ink is lowered, and the pigment is aggregated. If the pigment aggregates are formed, the printing head nozzles are clogged in some cases. In other cases, if the pigment aggregates are adhered and secured to the surroundings of the printing head nozzles, the ink-repelling coating surface of the printing head is damaged. Therefore, there is such a high possibility that the discharge failure may be caused, and the printing quality may be deteriorated. According to the observation of the inventors, it has been revealed that the phenomenon as described above is especially conspicuous when a black ink is used as the pigment ink and a magenta ink is used as the dye ink.

The problem of aggregation of the pigment-based ink as described above is conspicuous in an ink-jet printer which is provided with a simple maintenance system in order to reduce the production cost. For example, as described in U.S. Pat. No. 6,631,974 B2 corresponding to Japanese Patent Application Laid-open No. 2002-234151, such an ink-jet printer includes a printing head and a wiper member for collectively wiping the nozzles of respective colors of the printing head. However, the nozzle arrays of two colors are arranged while being extremely close to one another on the printing head. Therefore, it is impossible to divide, one color by one color, the suction cap for sucking and purging the inks in the printing head. In this structure, the nozzle arrays of two colors, which are disposed on the nozzle surface of the printing head, are collectively covered. For example, the nozzle arrays of the black ink and the cyan ink are collectively covered with the suction cap. The inks of two colors, which are simultaneously sucked by the aid of the suction cap, are mixed with each other in the suction cap, and parts of them are adhered to the nozzle surface in some cases. Therefore, when the wiping operation is performed, the mixed ink, which contains the pigment-based ink and the dye-based ink, is adhered, for example, to the wiper member and the nozzle surface of the printing head. If the pigment is aggregated at such positions, various inconveniences arise as described above. In some viewpoints, it may be possible to solve such inconveniences by improving the printer. However, such a countermeasure is extremely disadvantageous in view of the cost.

As described above, when the ink set for ink-jet recording, which is composed of the pigment-based ink and the dye-based ink, is carried on the ink-jet printer provided with the conventional maintenance system which is simple and at the low cost, it is feared that the ink-jet recording cannot be performed at a high quality due to the aggregation of the pigment.

SUMMARY OF THE INVENTION

The present invention has been made in order to solve the problems as described above, an object of which is to successfully perform the high quality printing in a stable manner by greatly suppressing the pigment aggregation when an ink set for ink-jet recording, which is composed of a pigment-based ink and a dye-based ink, is carried on an ink-jet printer provided with a conventional maintenance system which is simple and at the low cost. In particular, an object of the present invention is to provide an ink set which includes a specified combination of a pigment ink and a dye ink capable of effectively suppressing the pigment aggregation that would be otherwise caused by the contact between the pigment ink and the dye ink, and a method for producing the same.

The inventors have taken the notice of the amount of counter ion of a negatively chargeable and self-dispersible pigment contained in a pigment-based ink and the amount of counter ion of an anionic dye contained in a dye-based ink. The inventors have found out the fact that the pigment aggregation can be suppressed by regulating the relationship between them. Thus, the present invention has been completed.

According to a first aspect of the present invention, there is provided an ink set for ink-jet recording comprising:

a pigment ink which contains a negatively chargeable and self-dispersible pigment and;

a dye ink which contains an anionic dye, wherein the following expression (1) is satisfied:

$$Dci<1.1\times Pci+0.0001 \quad (1)$$

wherein Dci represents an amount of cation (mol/g) in the dye ink, and Pci represents an amount of cation (mol/g) in the pigment ink.

According to the present invention, the relationship between the amount of counter ion of the negatively chargeable and self-dispersible pigment contained in the pigment-based ink and the amount of counter ion of the anionic dye contained in the dye-based ink is regulated to be the specified relationship. Therefore, it is possible to greatly suppress the aggregation of the pigment.

According to a second aspect of the present invention, there is provided an ink-jet printer comprising the ink set for ink-jet recording of the present invention, a printing head which has a nozzle surface formed with a nozzle which discharges the pigment ink and a nozzle which discharges the dye ink, and a wiper member which wipes the nozzle surface, wherein the pigment ink and the dye ink, which are adhered to the nozzle surface of the printing head, are wiped by the wiper member. The ink-jet printer of the present invention uses the ink set in which the pigment aggregation is suppressed even when the pigment ink and the dye ink are mixed with each other. Therefore, even when the pigment ink and the dye ink, which are adhered to the nozzle surface, are wiped by the wiper member, the nozzle clog-up and the discharge failure are reduced.

According to a third aspect of the present invention, there is provided a method for producing an ink set for ink-jet recording having a pigment ink and a dye ink, the method comprising:

preparing the pigment ink which contains a negatively chargeable and self-dispersible pigment, and;

preparing the dye ink which contains an anionic dye, wherein:

an amount of cation in the pigment ink and an amount of cation in the dye ink satisfy the following expression (1):

$$Dci<1.1\times Pci+0.0001 \quad (1)$$

wherein "Dci" represents the amount of cation (mol/g) in the dye ink, and "Pci" represents the amount of cation (mol/g) in the pigment ink. When the pigment ink and the dye ink are prepared so that the relationship of the expression (1) is satisfied, it is possible to effectively avoid the pigment aggregation upon the contact and the mixing of the pigment ink and the dye ink of the ink set.

DESCRIPTION OF THE PREFERRED EMBODIMENTS

Embodiments of the present invention will be explained below.

The present invention is directed to an ink set for ink-jet recording including a pigment-based ink which contains a pigment as a coloring agent and a dye-based ink which contains a dye as a coloring agent; wherein the pigment is a negatively chargeable and self-dispersible pigment, the dye is an anionic dye, and the following expression (1) is satisfied.

$$Dci<1.1\times Pci+0.0001 \quad (1)$$

Figure 1:
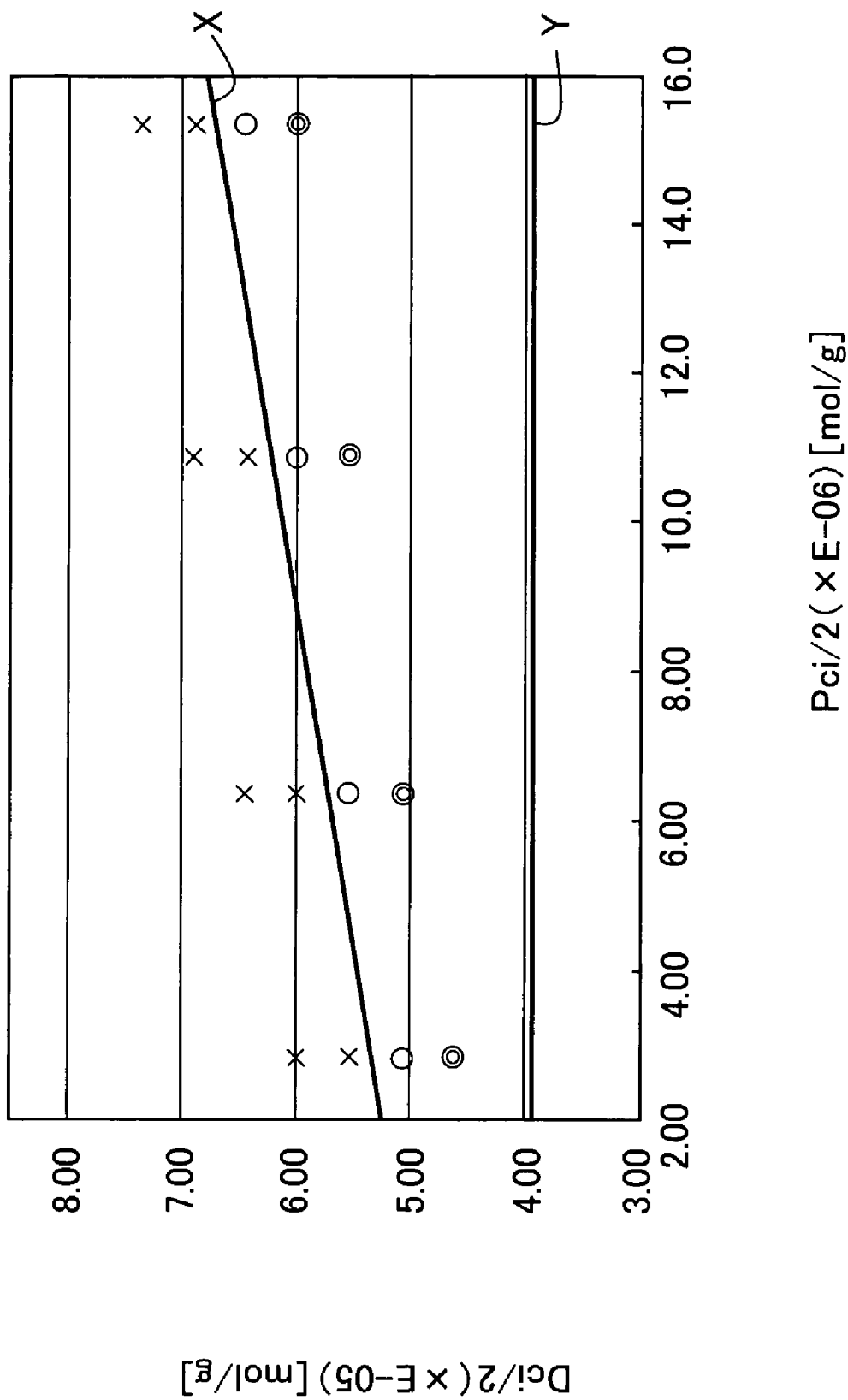
FIG. 1 shows a relationship between the amount of counter ion of the pigment contained in the pigment-based ink and the amount of counter ion of the dye contained in the dye-based ink in relation to the results of Examples and Comparative Examples of the present invention.

In the expression (1), "Dci" represents an amount of counter ion (mol/g) of the anionic dye contained in the dye-based ink, and "Pci" represents an amount of counter ion (mol/g) of the self-dispersible pigment contained in the pigment-based ink. As for the expression of relation (1), an equality is illustrated as shown in FIG. 1 (straight line X shown in FIG. 1). An area, which is located under the straight line X, satisfies the expression (1).

The significance of the expression (1) will be described below while explaining the mechanism of aggregation of the negatively chargeable and self-dispersible pigment.

It is considered that the amount of cation (principally sodium ion in general) of the self-dispersible pigment contained in the pigment-based ink exhibits the amount of ionic group (for example, dispersing group such as sulfonic acid group) which contributes to the self-dispersibility of the pigment. In general, the amount of cation in the pigment-based ink is fairly smaller than the amount of cation (principally sodium ion in general as well) in the dye-based ink. This results from the difference in the manner of existence of the coloring agent in the ink (i.e., dispersing state of water-insoluble pigment/dissolving state of water-soluble dye).

When the pigment-based ink and the dye-based ink make contact with each other, and they are mixed with each other, then the cation such as sodium ion, which is contained in the dye-based ink, flows into the pigment-based ink. Accordingly, the amount of cation is increased around the pigment particles, the dissociation equilibrium of counter ion is collapsed on the pigment surfaces, and the degree of dissociation or dissociation ratio is lowered. As a result, the following process is assumed. That is, the electric repulsive force of the pigment is lowered, the dispersion becomes unstable, and the aggregation is caused.

In the pigment-based ink, in general, the amount of cation, which originates from any material other than the pigment, is extremely small as compared with the total amount of cation in the ink. The same fact is also approved for the dye-based ink. Therefore, the total amount of cation in the pigment-based ink may be approximated to the amount of counter ion of the pigment because the cation principally originates from the pigment, and the total amount of cation in the dye-based ink may be approximated to the amount of counter ion of the dye because the cation principally originates from the dye.

Therefore, when the amount of cation in the dye-based ink (which may be approximated to the counter ion of the anionic dye) [Dci (mol/g)] is larger than the amount of cation in the pigment-based ink (which may be approximated to the amount of counter ion of the pigment) [Pci (mol/g)], a tendency arises such that the pigment is aggregated. As for the straight line X shown in FIG. 1, this fact has been experimentally determined from the experimental results obtained in Examples and Comparative Examples described later on. The area (area in which the amount of counter ion of the anionic dye in the dye-based ink is relatively high), which is disposed over the straight line X (Dci=1.1×Pci+0.0001), is an area in which the pigment tends to be aggregated.

It is certain that that the pigment is hardly aggregated when the amount of counter ion of the anionic dye in the dye-based ink is lowered. However, an inconvenience also arises. That is, in order to decrease the amount of counter ion of the anionic dye in the dye-based ink, it is necessary that the anionic dye, which has the water-soluble group such as the sulfonic acid group in a small amount, is used, or it is necessary that the amount of use of the anionic dye itself is decreased. However, in the case of the former, the solubility of the anionic dye in the aqueous solvent is lowered. Therefore, it is impossible to increase the dye concentration in the dye-based ink, and the optical density of the printed matter is lowered. In the case of the latter, the concentration of the anionic dye in the dye-based ink is also lowered. Therefore, the optical density of the printed matter is consequently lowered. Therefore, it is preferable that Dci (mol/g), which is approximated to the amount of counter ion of the anionic dye in the dye-based ink, satisfies the following expression (2) as represented by the straight line Y as shown in FIG. 1 (0.000074=Dci). The straight line Y exhibits the empirical lower limit of the practical optical density of the printed matter. The area (area in which the amount of counter ion of the anionic dye in the dye-based ink is relatively decreased), which is disposed under the straight line Y, is an area in which the optical density of the printed matter is low.

$$0.000074 < Dci \qquad (2)$$

As for the pigment to be used as the coloring agent in the pigment-based ink of the ink set for ink-jet recording of the present invention, known negatively chargeable and self-dispersible pigments are usable. In the case of such a pigment, for example, the carboxylation and/or sulfonation treatment is applied to the surface. The pigment has the negative zeta potential on the surface.

Specified examples of the pigment as described above can be exemplified, for example, by CAB-O-JET 200 BLACK, CAB-O-JET 300 BLACK, CAB-O-JET 250C CYAN, CAB-O-JET 260M MAGENTA, CAB-O-JET 270Y YELLOW (produced by Cabot), LIOJET WD BLACK 002C (produced by Toyo Ink Mfg. Co., Ltd.), BONJET BLACK CW-1, BONJET BLACK CW-2, and BONJET BLACK CW-3 (produced by Orient Chemical Industries, Ltd.). However, there is no limitation thereto.

The content of the pigment in the pigment-based ink is preferably 0.5 to 10% by weight.

Those usable as the dye for the dye-based ink include anionic dyes having counter ions of cations, preferably monoazo dyes. Specifically, for example, there may be exemplified C. I. Reactive Red 17, C. I. Acid Red 1, C. I. Acid Red 8, C. I. Acid Red 35, C. I. Acid Red 106, and C. I. Acid Red 265. The reason, why the monoazo dye is preferably usable, is that the hydrophobic group is contained in a small amount in the dye structure as compared with other dyes, and hence it is possible to suppress, to the minimum, the pigment aggregation effect of the dye itself brought about by the action on the hydrophobic portion of the pigment surface. The dyes as described above may be used singly. Alternatively, two or more of the dyes as described above may be used in a mixed manner.

The content of the anionic dye in the dye-based ink is preferably 0.5 to 10% by weight.

The dye contains various cations as impurities. Therefore, it is preferable to use one from which the impurities are removed by means of the purification. As for the purification method, for example, U.S. Pat. No. 5,637,138 A corresponding to Japanese Patent Application Laid-open No. 9-25441 discloses a specified method for removing the potassium content. The purification can be performed by a similar method. However, there is no limitation to this method. As for the other materials of the pigment-based ink and the dye-based ink, it is preferable to use those having high purities having been purified, in order to decrease impurities to be as minimum as possible.

When the negatively chargeable and self-dispersible pigment and the anionic dye are used as the coloring agents, the stabilities of the coloring agents in the ink are affected by the type and the concentration of the cation. For example, monovalent cations such as sodium ion and potassium ion, divalent cations such as calcium ion and magnesium ion, and trivalent or polyvalent cations such as aluminum ion and titanium ion have positive charges. Therefore, if the cation as described above is excessively contained in the pigment-based ink, then the cation is bonded to the negative charge on the pigment surface, and the electric charge becomes zero. As a result, the electric repulsive force of the pigment is lost, the dispersion becomes unstable, and the aggregation is caused. If the cation as described above is excessively contained in the dye-based ink, then the cation is bonded to the dye molecule having the negative charge, and the electric charge becomes zero. As a result, the salt is formed, and the dye molecule cannot be dissolved in the ink solvent. It is feared that the deposition may occur.

It is known that the divalent or multivalent cation has the extremely strong function to destabilize the dispersed state of the pigment and the dissolved state of the dye. For example, the aggregating force of the divalent ion is 20 to 80 times that of the monovalent ion. The aggregating force of the trivalent ion is a square of that of the divalent ion, which is amazingly large. The aggregating force of the tetravalent or polyvalent ion by far exceeds the above, which is extremely large.

Therefore, it is required that the content of the divalent or polyvalent cation is made to be as small as possible for each of the pigment-based ink and the dye-based ink. Specifically, it is preferable that the content is adjusted to be not more than 10 ppm.

In the ink set for ink-jet recording of the present invention, water is used as the ink solvent. However, it is preferable to use those having high purities including, for example, ion exchange water, distilled water, pure water, and ultrapure water.

Other than water, it is possible to use, as the ink solvent, water-soluble organic solvents having relatively low volatility in order to avoid the drying up and avoid the deposition of solid matters at the tip section of the ink-jet head. The water-soluble organic solvent as described above may include, for example, polyhydric alcohols such as ethylene glycol, diethylene glycol, triethylene glycol, polyethylene glycol, propylene glycol, dipropylene glycol, tripropylene glycol, polypropylene glycol, 1,3-butanediol, 1,5-pentanediol, 1,6-hexanediol, glycerol, 1,2,6-hexanetriol, 1,2,4-butanetriol, 1,2,3-butanetriol, and petriol; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethylsulfoxide, sulfolane, and thiodiethanol. The water-soluble organic solvents as described above may be used singly. Alternatively, two or more of the water-soluble organic solvents as described above may be used in a mixed manner as well.

If the content of the water-soluble organic solvent in the pigment-based ink or the dye-based ink is too small, then the moistening function is insufficient, and problems arise such that the ink is dried up and the solid matter is deposited when water in the ink is evaporated. If the content is too large, then the viscosity of the ink is unnecessarily increased, the discharge operation cannot be performed, and the ink is dried extremely slowly on the printing medium. Therefore, the content is preferably 5 to 40% by weight with respect to the total amount of the ink.

Polyhydric alcohol alkyl ether can be blended to the pigment-based ink or the dye-based ink in order to control the permeability. Specified examples may include, for example, propylene glycol, propylene glycol monopropyl ether, diethylene glycol monomethyl ether, diethylene glycol monobutyl ether, diethylene glycol monoisobutyl ether, diethylene glycol dimethyl ether, diethylene glycol diethyl ether, diethylene glycol dibutyl ether, dipropylene glycol monomethyl ether, dipropylene glycol monopropyl ether, dipropylene glycol monoisopropyl ether, dipropylene glycol monobutyl ether, dipropylene glycol dimethyl ether, dipropylene glycol dipropyl ether, dipropylene glycol dibutyl ether, triethylene glycol monomethyl ether, triethylene glycol monobutyl ether, tripropylene glycol monomethyl ether, tripropylene glycol monobutyl ether, triethylene glycol dimethyl ether, triethylene glycol dibutyl ether, tripropylene glycol dimethyl ether, and tripropylene glycol dibutyl ether.

The content of the permeating agent in the pigment-based ink or the dye-based ink is preferably 0.05 to 15% by weight.

Monohydric alcohol such as ethanol and isopropyl alcohol can be blended to the pigment-based ink or the dye-based ink in order to control the drying performance and the permeability with respect to the printing medium.

It is preferable that the surface tension is adjusted in order to satisfy, for example, the discharge stability of the pigment-based ink or the dye-based ink, the introducing performance into the ink-jet head, and the printing quality. For this purpose, it is possible to use the surfactant. Specifically, there may be exemplified, for example, anionic surfactants such as EMAL, LATEMUL, LEVENOL, NEOPELEX, ELECTROSTRIPPER, NS SAOP, KS SAOP, OS SAOP, PELEX, and AMPHITOL series produced by Kao Corporation, and LIPOLAN, K LIPOLAN, LIPON, SUNNOL, LIPOTAC TE, ENAGICOL, LIPAL, LIONOL, and LOTAT series produced by Lion Corporation; and nonionic surfactants such as EMULGEN, RHEODOL, RHEODOL SUPER, EMASOL, EMASOL SUPER, EXCEL, EMANON, AMIET, and AMINON series produced by Kao Corporation, and DOBANOX, LEOCOL, LEOX, LAOL, LEOCON, LIONOL, CADENAX, LIONON, LEOFAT, ETHOFAT, ETHOMEEN, ETHODUOMEEN, ETHOMID, and AROMOX produced by Lion Corporation. However, there is no special limitation thereto. The surfactants as described above may be used singly. Alternatively, two or more of the surfactants as described above may be used in a mixed manner as well.

The ink set for ink-jet recording of the present invention is basically constructed as described above. Other than the above, if necessary, for example, known pH-adjusting agents, dye-dissolving agents, antiseptic/fungicidal agents, and rust-proofing agents can be added to the pigment-based ink and the dye-based ink respectively.

The ink set for ink-jet recording including the pigment-based ink and the dye-based ink of the present invention can be preferably produced by selecting or preparing the pigment-based ink which uses a negatively chargeable and self-dispersible pigment as a coloring agent, and the dye-based ink which uses an anionic dye as a coloring agent, wherein the expression (1) described above is satisfied, and the expression (2) described above is preferably satisfied to assemble a set. The term "assemble a set" means that the inks are prepared to be used in one ink-jet printer. Therefore, the present invention also includes the accommodation of the pigment-based ink and the dye-based ink in one cartridge or respective cartridges.

The ink set for ink-jet recording of the present invention can be used for general ink-jet printers. However, the ink set for ink-jet recording of the present invention is preferably applicable to an ink-jet printer including a printing head which has a nozzle surface formed with a nozzle which discharges the pigment-based ink and a nozzle which discharges the dye-based ink, and a wiper member which wipes the nozzle surface, wherein the pigment-based ink and the dye-based ink, which are adhered to the nozzle surface of the printing head, are wiped by the wiper member, as disclosed in U.S. Pat. No. 6,631,974 B2 corresponding to Japanese Patent Application Laid-open No. 2002-234151. In this case, the driving force for allowing ink droplets to fly is preferably based on the use of a piezoelectric element. However, the present invention is also applicable to the ink-jet system of the type in which the ink is discharged in accordance with the action of the thermal energy.

EXAMPLES

Ink sets of Examples 1 to 8 for embodying the present invention and Comparative Examples 1 to 8 for the purpose of comparison will be described below. Black inks were prepared as pigment-based inks and color inks (magenta inks) were prepared as dye-based inks for constructing the ink sets. The amounts of cation (sodium ion) (considered to be the amounts of counter ion of the pigment and the dye judging from the purities of the materials for preparing the inks) [Pci] and [Dci] were measured for the respective inks by the ICP emission spectrometry (ICPS-1000IV produced by Shimadzu Corporation).

TABLE 1

| Component | | % by weight |
|---|---|---|
| Ink formulation of pigment-based black ink of Example 1 | | |
| Coloring agent | CAB-O-JET 300 BLACK (pigment content: 15%) | 30.7 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| Ink formulation of dye-based magenta ink of Example 1 | | |
| Coloring agent | C. I. Reactive Red 17 | 2.4 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $0.6 \times 10^{-5}$ mol/g
Amount of cation in 1 g of dye-based ink [Dci] = $9.2 \times 10^{-5}$ mol/g

TABLE 2

| Component | | % by weight |
|---|---|---|
| | Ink formulation of pigment-based black ink of Example 2 | |
| Coloring agent | CAB-O-JET 300 BLACK (pigment content: 15%) | 30.7 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Example 2 | |
| Coloring agent | C. I. Reactive Red 17 | 2.6 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $0.6 \times 10^{-5}$ mol/g
Amount of cation in 1 g of dye-based ink [Dci] = $10.2 \times 10^{-5}$ mol/g

TABLE 3

| Component | | % by weight |
|---|---|---|
| | Ink formulation of pigment-based black ink of Example 3 | |
| Coloring agent | BONJET BLACK CW-1 (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Example 3 | |
| Coloring agent | C. I. Reactive Red 17 | 2.6 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $1.3 \times 10^{-5}$ mol/g
Amount of cation in 1 g of dye-based ink [Dci] = $10.2 \times 10^{-5}$ mol/g

TABLE 4

| Component | | % by weight |
|---|---|---|
| | Ink formulation of pigment-based black ink of Example 4 | |
| Coloring agent | BONJET BLACK CW-1 (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Example 4 | |
| Coloring agent | C. I. Reactive Red 17 | 2.9 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $1.3 \times 10^{-5}$ mol/g
Amount of cation in 1 g of dye-based ink [Dci] = $11.1 \times 10^{-5}$ mol/g

TABLE 5

| Component | | % by weight |
|---|---|---|
| | Ink formulation of pigment-based black ink of Example 5 | |
| Coloring agent | LIOJET WD BLACK 002C (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Example 5 | |
| Coloring agent | C. I. Reactive Red 17 | 2.9 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $2.2 \times 10^{-5}$ mol/g
Amount of cation in 1 g of dye-based ink [Dci] = $11.1 \times 10^{-5}$ mol/g

TABLE 6

| Component | | % by weight |
|---|---|---|
| | Ink formulation of pigment-based black ink of Example 6 | |
| Coloring agent | LIOJET WD BLACK 002C (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Example 6 | |
| Coloring agent | C. I. Reactive Red 17 | 3.1 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $2.2 \times 10^{-5}$ mol/g
Amount of cation in 1 g of dye-based ink [Dci] = $12.0 \times 10^{-5}$ mol/g

TABLE 7

| Component | | % by weight |
|---|---|---|
| Ink formulation of pigment-based black ink of Example 7 | | |
| Coloring agent | BONJET BLACK CW-3 (pigment content: 13%) | 30.8 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| Ink formulation of dye-based magenta ink of Example 7 | | |
| Coloring agent | C. I. Reactive Red 17 | 3.1 |
| Moistening agent | Glycerol | 29.0 |
| Permeating agent | Dipropylene glycol propyl ether | 2.0 |
| Water | Pure water | balance |

Amount of counter ion in 1 g of pigment-based ink $[Pci] = 3.1 \times 10^{-5}$ mol/g
Amount of cation in 1 g of dye-based ink $[Dci] = 12.0 \times 10^{-5}$ mol/g

TABLE 8

| Component | | % by weight |
|---|---|---|
| Ink formulation of pigment-based black ink of Example 8 | | |
| Coloring agent | BONJET BLACK CW-3 (pigment content: 13%) | 30.8 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| Ink formulation of dye-based magenta ink of Example 8 | | |
| Coloring agent | C. I. Reactive Red 17 | 3.4 |
| Moistening agent | Glycerol | 29.0 |
| Permeating agent | Dipropylene glycol propyl ether | 2.0 |
| Water | Pure water | balance |

Amount of counter ion in 1 g of pigment-based ink $[Pci] = 3.1 \times 10^{-5}$ mol/g
Amount of cation in 1 g of dye-based ink $[Dci] = 12.9 \times 10^{-5}$ mol/g

TABLE 9

| Component | | % by weight |
|---|---|---|
| Ink formulation of pigment-based black ink of Comparative Example 1 | | |
| Coloring agent | CAB-O-JET 300 BLACK (pigment content: 15%) | 26.7 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| Ink formulation of dye-based magenta ink of Comparative Example 1 | | |
| Coloring agent | C. I. Reactive Red 17 | 2.9 |
| Moistening agent | Glycerol | 29.0 |
| Permeating agent | Dipropylene glycol propyl ether | 2.0 |
| Water | Pure water | balance |

Amount of counter ion in 1 g of pigment-based ink $[Pci] = 0.6 \times 10^{-5}$ mol/g
Amount of cation in 1 g of dye-based ink $[Dci] = 11.1 \times 10^{-5}$ mol/g

TABLE 10

| Component | | % by weight |
|---|---|---|
| Ink formulation of pigment-based black ink of Comparative Example 2 | | |
| Coloring agent | CAB-O-JET 300 BLACK (pigment content: 15%) | 26.7 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| Ink formulation of dye-based magenta ink of Comparative Example 2 | | |
| Coloring agent | C. I. Reactive Red 17 | 3.1 |
| Moistening agent | Glycerol | 29.0 |
| Permeating agent | Dipropylene glycol propyl ether | 2.0 |
| Water | Pure water | balance |

Amount of counter ion in 1 g of pigment-based ink $[Pci] = 0.6 \times 10^{-5}$ mol/g
Amount of cation in 1 g of dye-based ink $[Dci] = 12.0 \times 10^{-5}$ mol/g

TABLE 11

| Component | | % by weight |
|---|---|---|
| Ink formulation of pigment-based black ink of Comparative Example 3 | | |
| Coloring agent | BONJET BLACK CW-1 (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| Ink formulation of dye-based magenta ink of Comparative Example 3 | | |
| Coloring agent | C. I. Reactive Red 17 | 3.1 |
| Moistening agent | Glycerol | 29.0 |
| Permeating agent | Dipropylene glycol propyl ether | 2.0 |
| Water | Pure water | balance |

Amount of counter ion in 1 g of pigment-based ink $[Pci] = 1.3 \times 10^{-5}$ mol/g
Amount of cation in 1 g of dye-based ink $[Dci] = 12.0 \times 10^{-5}$ mol/g

TABLE 12

| Component | | % by weight |
|---|---|---|
| | Ink formulation of pigment-based black ink of Comparative Example 4 | |
| Coloring agent | BONJET BLACK CW-1 (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Comparative Example 5 | |
| Coloring agent | C. I. Reactive Red 17 | 3.4 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $1.3 \times 10^{-5}$ mol/g
Amount of cation in 1 g of dye-based ink [Dci] = $12.9 \times 10^{-5}$ mol/g

TABLE 13

| Component | | % by weight |
|---|---|---|
| | Ink formulation of pigment-based black ink of Comparative Example 5 | |
| Coloring agent | LIOJET WD BLACK 002C (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Comparative Example 5 | |
| Coloring agent | C. I. Reactive Red 17 | 3.4 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $2.2 \times 10^{-5}$ mol/g
Amount of cation in 1 g of dye-based ink [Dci] = $12.9 \times 10^{-5}$ mol/g

TABLE 14

| Component | | % by weight |
|---|---|---|
| | Ink formulation of pigment-based black ink of Comparative Example 6 | |
| Coloring agent | LIOJET WD BLACK 002C (pigment content: 20%) | 20.0 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Comparative Example 6 | |
| Coloring agent | C. I. Reactive Red 17 | 3.6 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $2.2 \times 10^{-5}$ mol/g
Amount of cation in 1 g of dye-based ink [Dci] = $13.9 \times 10^{-5}$ mol/g

TABLE 15

| Component | | % by weight |
|---|---|---|
| | Ink formulation of pigment-based black ink of Comparative Example 7 | |
| Coloring agent | BONJET BLACK CW-3 (pigment content: 13%) | 30.8 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Comparative Example 7 | |
| Coloring agent | C. I. Reactive Red 17 | 3.6 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $3.1 \times 10^{-5}$ mol/g
Amount of cation in 1 g of dye-based ink [Dci] = $13.9 \times 10^{-5}$ mol/g

TABLE 16

| Component | | % by weight |
|---|---|---|
| | Ink formulation of pigment-based black ink of Comparative Example 8 | |
| Coloring agent | BONJET BLACK CW-3 (pigment content: 13%) | 30.8 |
| Moistening agent | Glycerol | 25.5 |
| Permeating agent | Dipropylene glycol propyl ether | 1.0 |
| Additive | SUNNOL DL 1430 | 0.1 |
| Water | Pure water | balance |
| | Ink formulation of dye-based magenta ink of Comparative Example 8 | |
| Coloring agent | C. I. Reactive Red 17 | 3.8 |
| Moistening agent | Glycerol | 29.0 |
| Permeating agent | Dipropylene glycol propyl ether | 2.0 |
| Water | Pure water | balance |

Amount of counter ion in 1 g of pigment-based ink [Pci] = $3.1 \times 10^{-5}$ mol/g
Amount of cation in 1 g of dye-based ink [Dci] = $14.8 \times 10^{-5}$ mol/g Tests were performed to make evaluation about whether or not the pigment was aggregated when the obtained pigment-based ink and the obtained dye-based ink of each of Examples and Comparative Examples were mixed with each other and about whether or not the clog-up of the nozzle was caused as described below. Obtained results are shown in Table 17.

Pigment Aggregation Test

One drop of the pigment-based ink and one drop of the dye-based ink were allowed to fall onto a slide glass while being separated from each other. A cover glass was stationarily placed on the two droplets so that the two inks were allowed to make contact with each other beneath the slide glass. A contact area of these inks was microscopically observed, and the situation of aggregation of the pigment was visually observed. The following fact has been revealed according to a preliminary experiment performed by the inventors. That is, this technique is approximate to the mixing state of the pigment-based ink and the dye-based ink on the nozzle surface of the printing head and to the actual mixing state of the pigment-based ink and the dye-based ink caused by the wiper or the like, as compared with other aggregation tests to be performed by mixing and agitating the pigment-based ink and the dye-based ink. Further, this technique correlates with the aggregation state of the pigment on the actual machine extremely satisfactorily. The following evaluation criteria were adopted.

Evaluation Criteria for Pigment Aggregation

| Rank | Contents |
|---|---|
| ++: | Aggregation is not caused, or aggregates are not more than about 10 μm even when aggregation is caused, wherein the aggregates have fluidity. |
| +: | Aggregates have sizes of not more than about 20 μm, wherein the aggregates have fluidity. |
| −: | Aggregates have sizes exceeding about 20 μm, the aggregates are formed over the entire contact surface, and the aggregates have no fluidity. |

Nozzle Clog-Up Test

A wiping test for the head nozzle surface was carried out continuously 3,000 times at room temperature to evaluate the nozzle clog-up for each of the ink sets of Examples and Comparative Examples. The printer, which was used as a machine for the evaluation, was MFC-3100C produced by Brother Industries, Ltd. The printer has such a structure that the pigment-based ink and the dye-based ink make contact with each other, because the nozzle arrays, which discharge the pigment-based ink (black ink) and the dye-based ink (color ink) respectively, are collectively wiped in the lateral direction in the wiping test for the printing head nozzle surface. The following criteria were adopted.

Evaluation Criteria for Nozzle Clog-up

| Rank | Contents |
|---|---|
| +: | The discharge failure and the bending of discharged ink are not caused in the wiping test for the printing head nozzle surface performed continuously 3,000 times. |
| −: | The discharge failure and the bending of discharged ink are caused in the wiping test for the printing head nozzle surface performed continuously 3,000 times, and both of the discharge failure and the bending are not restored in a short period of time. |

TABLE 17

| | Evaluation by microscopic observation | Evaluation of nozzle clog-up |
|---|---|---|
| Example 1 | ++ | + |
| Example 2 | + | + |
| Example 3 | ++ | + |
| Example 4 | + | + |
| Example 5 | ++ | + |
| Example 6 | + | + |
| Example 7 | ++ | + |
| Example 8 | + | + |
| Comp. Ex. 1 | − | − |
| Comp. Ex. 2 | − | − |
| Comp. Ex. 3 | − | − |
| Comp. Ex. 4 | − | − |
| Comp. Ex. 5 | − | − |
| Comp. Ex. 6 | − | − |
| Comp. Ex. 7 | − | − |
| Comp. Ex. 8 | − | − |

As clarified from Table 17, according to Examples of the present invention, the pigment-based ink (black ink) and the dye-based ink (color ink) are stable in the dispersibility or the solubility when each of them exists singly. Further, even when they make contact with each other and they are mixed with each other, then the aggregation of the pigment is not caused. Therefore, the aggregates of the pigment do not clog up the printing head nozzle, and they do not adhere and secure the surroundings thereof to damage the ink-repelling coating surface. Therefore, the discharge failure is not caused, and the printing quality is not deteriorated. Further, the aggregates do not adhere and secure the wiper to make the wiping operation nonuniform. Therefore, the reliability is not deteriorated as well.

According to the test condition for the pigment aggregation test, when the pigment-based ink and the dye-based ink are mixed with each other at 1:1, then the amount of counter ion of the pigment in the mixture liquid is $Pci/2$, and the amount of counter ion of the dye is $Dci/2$. $Pci/2$'s of the pigment-based inks and $Dci/2$'s of the dye-based inks of respective Examples and Comparative Examples are plotted in FIG. 1. Data of Examples are shown by double circles corresponding to the evaluation "++" in Table 17 and circles corresponding to the evaluation "+" in Table 17, and data of Comparative Examples are shown by crosses corresponding to the evaluation "−" in Table 17.

As understood from FIG. 1, the inks of Examples are included in an area disposed under the straight line X (i.e., $Dci=1.1 \times Pci+0.0001$). The inks of respective Comparative Examples, which involve problems in relation to the performance, are included in an area over the straight line X. Therefore, it is appreciated that the balance between the dispersing group on the pigment surface and the counter ion of the dye is important in order to suppress the aggregation of the pigment.

In the ink set for ink-jet printer of the present invention, the aggregation of the pigment is suppressed upon the contact and the mixing of the pigment-based ink and the dye-based ink, and the nozzle clog-up is also suppressed, even when the pigment-based ink containing the pigment and the dye-based ink containing the dye are used in combination. Accordingly, when the ink set is used for the ink-jet printer, any serious deterioration of the printing quality such as the discharge failure and the discharge bending is not caused, which would be otherwise caused by the aggregation due to the destabilization of the pigment dispersion. Further, it is unnecessary to make the division for the pigment-based ink and the dye-based ink in the maintenance system such as the wiper as well.

Therefore, the present invention can also greatly contribute to the decrease in the cost. Therefore, it is possible to simultaneously realize the stable printing quality, the high printing quality, and the high reliability by using the low cost printer.

An embodiment of an ink jet printer as an ink-jet recording apparatus in accordance with the invention will be described as below with reference to the accompanying drawings.

Figure 2:
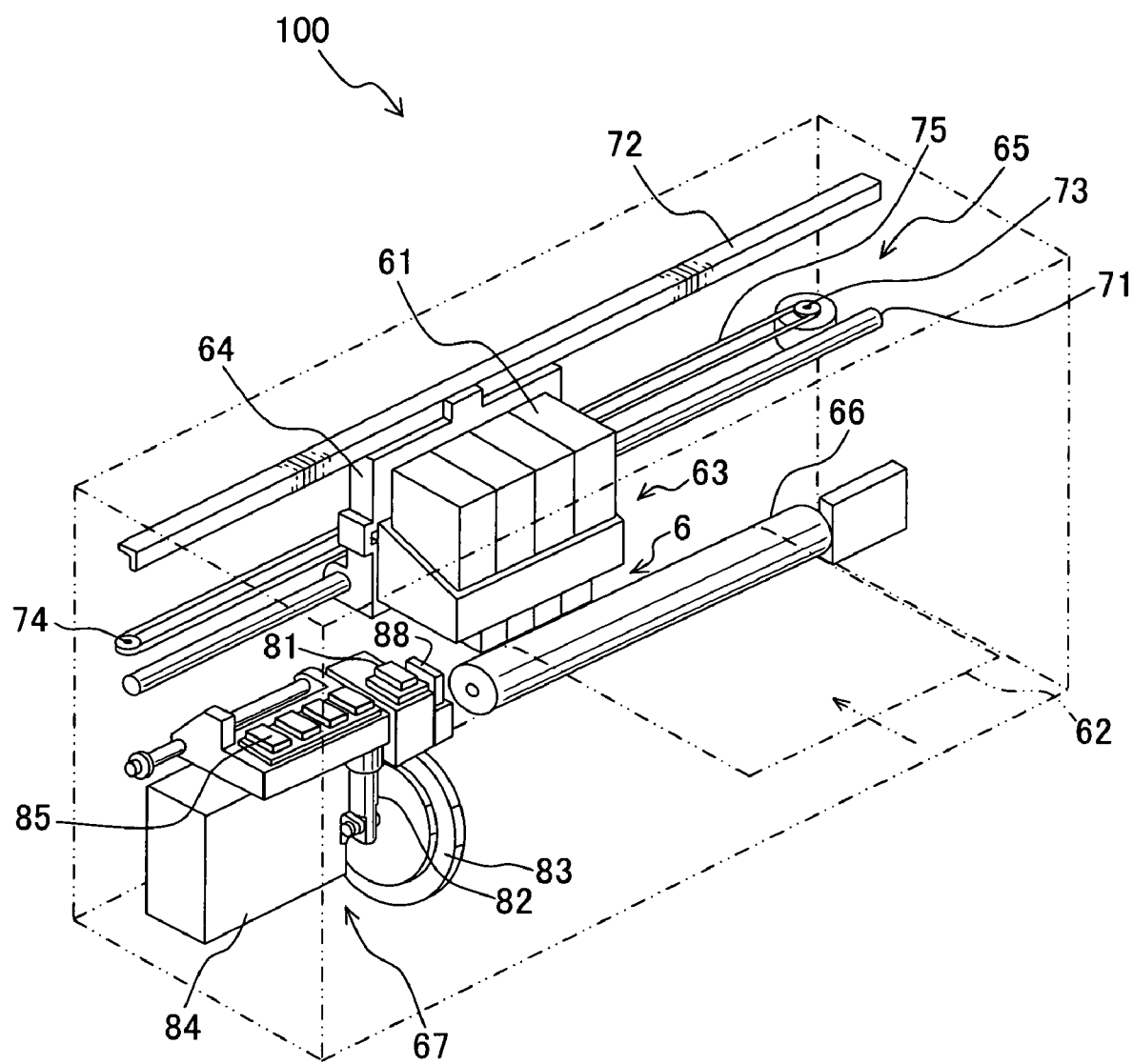
FIG. 2 is a perspective view showing a color ink-jet printer having an ink cartridge which contains ink prepared in examples of the invention.

As shown in FIG. 2, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 2.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 3) in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

Figure 3:
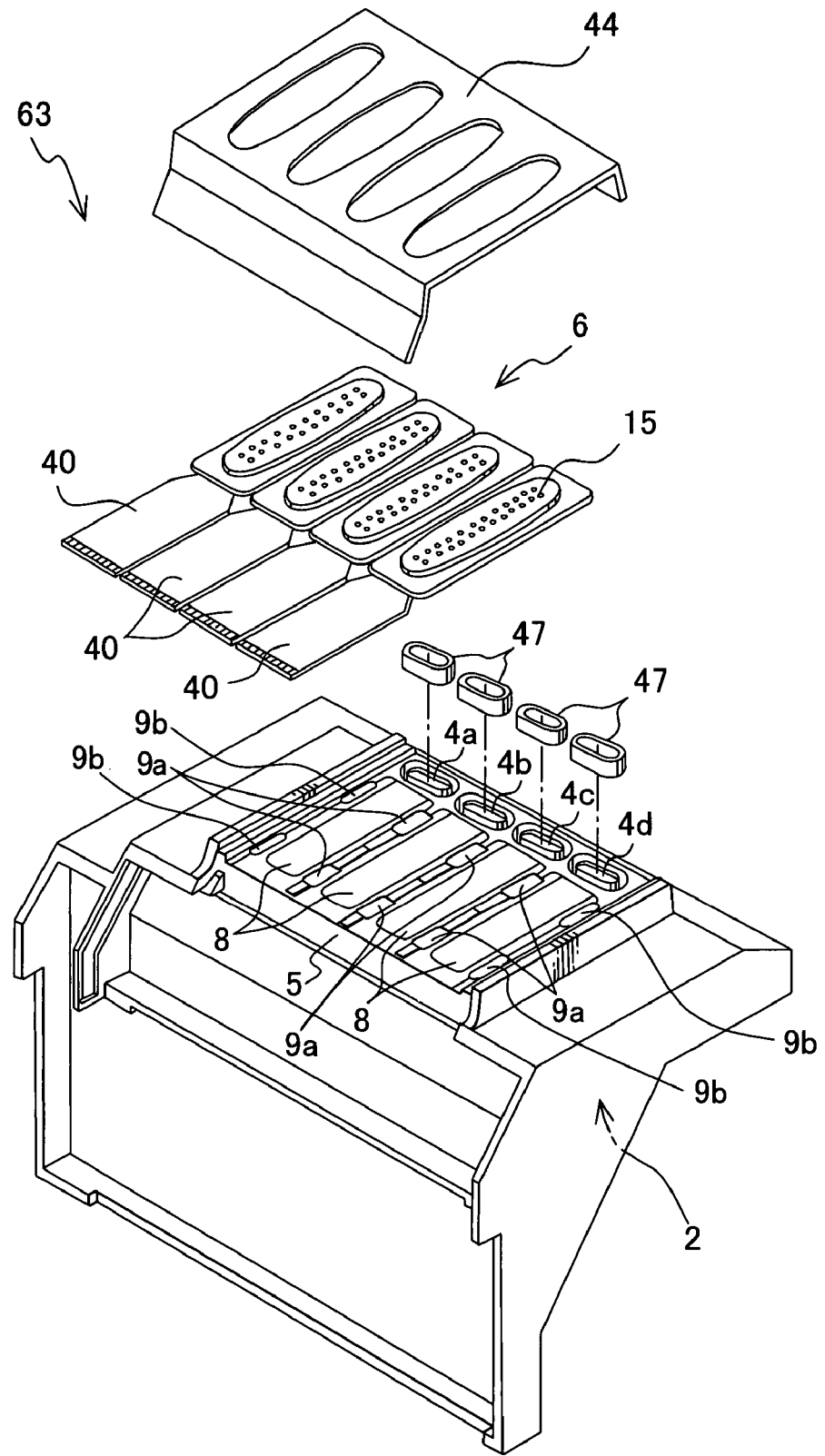
FIG. 3 is a perspective view of a head unit, with its nozzles facing upward.

As shown in FIG. 3, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

The black, cyan, magenta and yellow inks may be mixed on the surface of head 6 or wiper 88 by wiping operation. However, aggregation of the pigment due to the mixture of the pigment ink and the dye ink is effectively restrained because the ink set of the invention is used for the pigment ink and the dye ink.

What is claimed is:

1. An ink set for ink-jet recording comprising:
   a pigment ink which contains a negatively chargeable and self-dispersible pigment and;
   a dye ink which contains an anionic dye, wherein the following expression (1) is satisfied:

$$Dci < 1.1 \times Pci + 0.0001 \qquad (1)$$

wherein Dci represents an amount of cation (mol/g) in the dye ink, and Pci represents an amount of cation (mol/g) in the pigment ink; and
   the amount of cation in the pigment ink being substantially an amount of counter ion of the self-dispersible pigment.

2. The ink set for ink-jet recording according to claim 1, wherein the amount of cation in the dye ink is substantially an amount of counter ion of the anionic dye.

3. The ink set for ink-jet recording according to claim 1, wherein Dci (mol/g) satisfies the following expression (2):

$$0.000074 < Dci \qquad (2).$$

4. The ink set for ink-jet recording according to claim 1, wherein an amount of divalent or polyvalent cation is not more than 10 ppm in each of the pigment ink and the dye ink when the cation includes the divalent or polyvalent cation.

5. The ink set for ink-jet recording according to claim 1, wherein the dye is a monoazo dye.

6. The ink set for ink-jet recording according to claim 1, wherein the dye ink is a magenta ink.

7. The ink set for ink-jet recording according to claim 1, wherein the pigment is carbon black.

8. The ink set for ink-jet recording according to claim 1, wherein both of the pigment ink and the dye ink contain glycerol.

9. The ink set for ink-jet recording according to claim 1, wherein both of the pigment ink and the dye ink contain water and a water-soluble organic solvent.

10. An ink-jet printer comprising the ink set for ink-jet recording as defined in claim 1, a printing head which has a nozzle surface formed with a nozzle which discharges the pigment ink and a nozzle which discharges the dye ink, and a wiper member which wipes the nozzle surface, wherein the pigment ink and the dye ink, which are adhered to the nozzle surface of the printing head, are wiped by the wiper member.

11. A method for producing an ink set for ink-jet recording having a pigment ink and a dye ink, the method comprising:
   preparing the pigment ink which contains a negatively chargeable and self-dispersible pigment; and
   preparing the dye ink which contains an anionic dye, wherein:
   an amount of cation in the pigment ink and an amount of cation in the dye ink satisfy the following expression (1):

$$Dci < 1.1 \times Pci + 0.0001 \qquad (1)$$

wherein Dci represents the amount of cation (mol/g) in the dye ink, and Pci represents the amount of cation (mol/g) in the pigment ink; and the amount of cation in the pigment ink being substantially an amount of counter ion of the self-dispersible pigment.

12. The method for producing the ink set for ink-jet recording according to claim 11, wherein the amount of cation in the dye ink is substantially an amount of counter ion of the anionic dye.

13. The method for producing the ink set for ink-jet recording according to claim 11, wherein Dci (mol/g) satisfies the following expression (2):

$$0.000074 < Dci \qquad (2).$$

14. The method for producing the ink set for ink-jet recording according to claim 11, wherein the pigment ink and the dye ink are prepared respectively so that the amount of divalent or polyvalent cation is not more than 10 ppm.

15. The method for producing the ink set for ink-jet recording according to claim 11, wherein the dye is a monoazo dye.

16. The method for producing the ink set for ink-jet recording according to claim 11, wherein the dye ink is a magenta ink.

17. The method for producing the ink set for ink-jet recording according to claim 11, wherein the pigment is carbon black.

* * * * *